US012728358B2

(12) United States Patent
Hirayama

(10) Patent No.: US 12,728,358 B2
(45) Date of Patent: Sep. 8, 2026

(54) INFORMATION PROCESSING PROGRAM, INFORMATION PROCESSING METHOD, AND INFORMATION PROCESSING APPARATUS

(71) Applicant: KOEI TECMO GAMES CO., LTD., Yokohama (JP)

(72) Inventor: Masakazu Hirayama, Kanagawa (JP)

(73) Assignee: KOEI TECMO GAMES CO., TD., Yokohama (JP)

( * ) Notice: Subject to any disclaimer, the term of this patent is extended or adjusted under 35 U.S.C. 154(b) by 264 days.

(21) Appl. No.: 18/613,160

(22) Filed: Mar. 22, 2024

(65) Prior Publication Data

US 2025/0090957 A1 Mar. 20, 2025

(30) Foreign Application Priority Data

Sep. 15, 2023 (JP) ................................ 2023-150584

(51) Int. Cl.
*A63F 13/67* (2014.01)
*A63F 13/58* (2014.01)

(52) U.S. Cl.
CPC .............. *A63F 13/67* (2014.09); *A63F 13/58* (2014.09)

(58) Field of Classification Search
None
See application file for complete search history.

(56) References Cited

U.S. PATENT DOCUMENTS

2002/0045470 A1* 4/2002 Atsumi ................... A63F 13/10 463/9
2007/0060226 A1* 3/2007 Sakaguchi .............. A63F 13/45 463/1
2007/0173333 A1 7/2007 Matsuhara et al.
2010/0184498 A1* 7/2010 Takahashi ............. A63F 13/822 463/30
2016/0279522 A1* 9/2016 de Plater ................. A63F 13/58
2016/0367900 A1* 12/2016 Suzuki .................... A63F 13/67
2023/0088206 A1* 3/2023 Pan ......................... A63F 13/58 463/31

FOREIGN PATENT DOCUMENTS

JP 2007-195676 A 8/2007

OTHER PUBLICATIONS https://expo.nikkeibp.co.jp/tgs/2022/jp/ (Sep. 15, 2022), Tokyo Game Show 2022, Makuhari Messe.
W0 Long: Fallen Dynasty Game, https://store.playstation.com/ja-jp/product/JP0106-PPSA09292_00-TRIAL00000000000 (Sep. 16, 2022).
W0 Long: Fallen Dynasty Demo, https://www.xbox.com/ja-jp/games/store/wo-long-fallen-dynasty-demo/9n1nr9kjrcr6 (Sep. 16, 2022).
(Continued)

*Primary Examiner* — Jason T Yen
(74) *Attorney, Agent, or Firm* — SOLARIS Intellectual Property Group, PLLC

(57) ABSTRACT

An information processing program causes a computer to execute setting, for a character, a first level that is maintained even when a predetermined range is exceeded and a second level that is not maintained when the predetermined range is exceeded in a game in which a level for determining power is set for the character.

15 Claims, 5 Drawing Sheets

(56) References Cited

OTHER PUBLICATIONS

Famitsu Weekly, Oct. 6, 2022 Issue, No. 1764, p. 134-139, Publication: Kadokawa, Kadokawa Game Linkage (Sep. 22, 2022).
"Wo Long" review, https://www.famitsu.com/news/202301/17289664.html (Jan. 17, 2023).
"Wo Long" review, https://youtu.be/4kHaobzLoJw (Jan. 17, 2023).
Wo Long: Fallen Dynasty Game, https://youtu.be/PpEofrhG6Fo (Feb. 24, 2023).
Wo Long: Fallen Dynasty Game, https://store.playstation.com/ja-jp/product/JP0106-PPSA05795_00-WOLONG0000000000 (Feb. 24, 2023).
Wo Long: Fallen Dynasty Game, https://www.xbox.com/ja-jp/games/store/wo-long-fallen-dynasty/9n9x9pc8v9cp (Feb. 24, 2023).
Wo Long: Fallen Dynasty Game, https://store.steampowered.com/app/1448440/ (Feb. 24, 2023).
Famitsu Weekly, Mar. 16, 2023 Issue, No. 1787, p. 80-89, Publication: Kadokawa, Kadokawa Game Linkage (Mar. 2, 2023).
"Wo Long: Fallen Dynasty" release commemorative web live broadcast, Youtube : https://www.youtube.com/watch?v=nWVJYM4uZig (Mar. 2, 2023).
"Wo Long: Fallen Dynasty" release commemorative web live broadcast, Nikoniko:https://live.nicovideo.jp/watch/lv340313177 (Mar. 2, 2023).
"Wo Long: Fallen Dynasty" release commemorative web live broadcast, Twitter: https://twitter.com/WoLongOfficial (Mar. 2, 2023).
"Wo Long: Fallen Dynasty" release commemorative web live broadcast, Steam: https://store.steampowered.com/news/app/1448440 (Mar. 2, 2023).
"Wo Long: Fallen Dynasty" release commemorative web live broadcast, BiliBili: https://live.bilibili.com/10038924 (Mar. 2, 2023).
"Wo Long: Fallen Dynasty" release commemorative web live broadcast, Huya: https://www.huya.com/494638 (Mar. 2, 2023).
Wo Long: Fallen Dynasty Game, https://store.playstation.com/ja-jp/product/JP0106-PPSA05795_00-WOLONG0000000000 (Mar. 3, 2023).
Wo Long: Fallen Dynasty Game, https://www.xbox.com/ja-jp/games/store/wo-long-fallen-dynasty/9n9x9pc8v9cp (Mar. 3, 2023).
Wo Long: Fallen Dynasty Game, https://store.steampowered.com/app/1448440/ (Mar. 3, 2023).

* cited by examiner

FIG.4
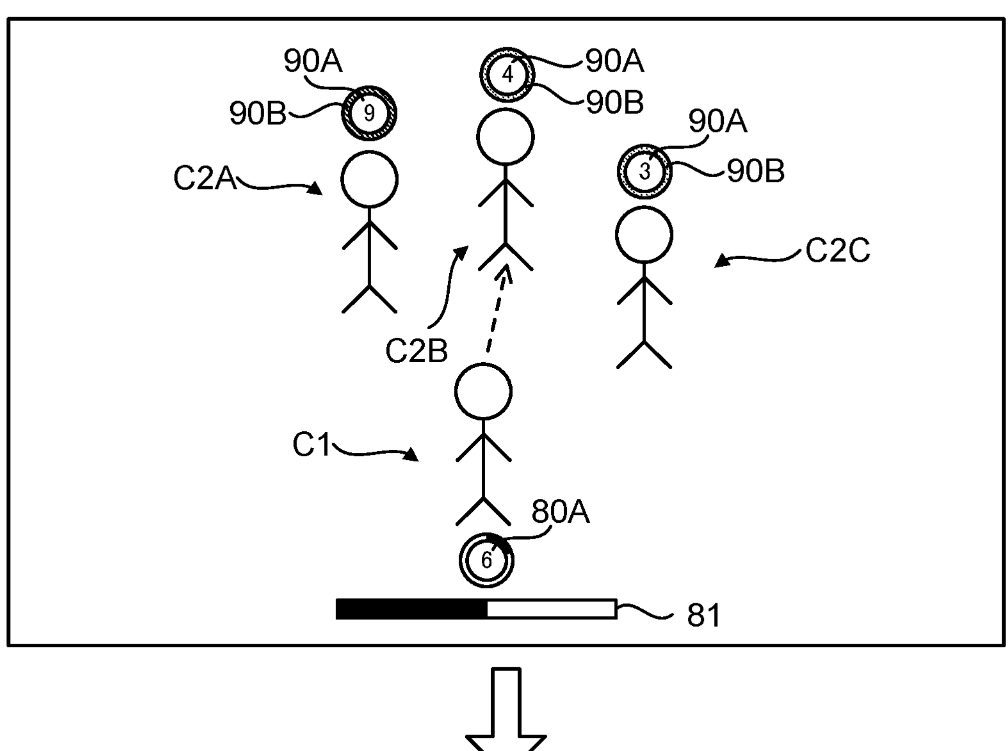
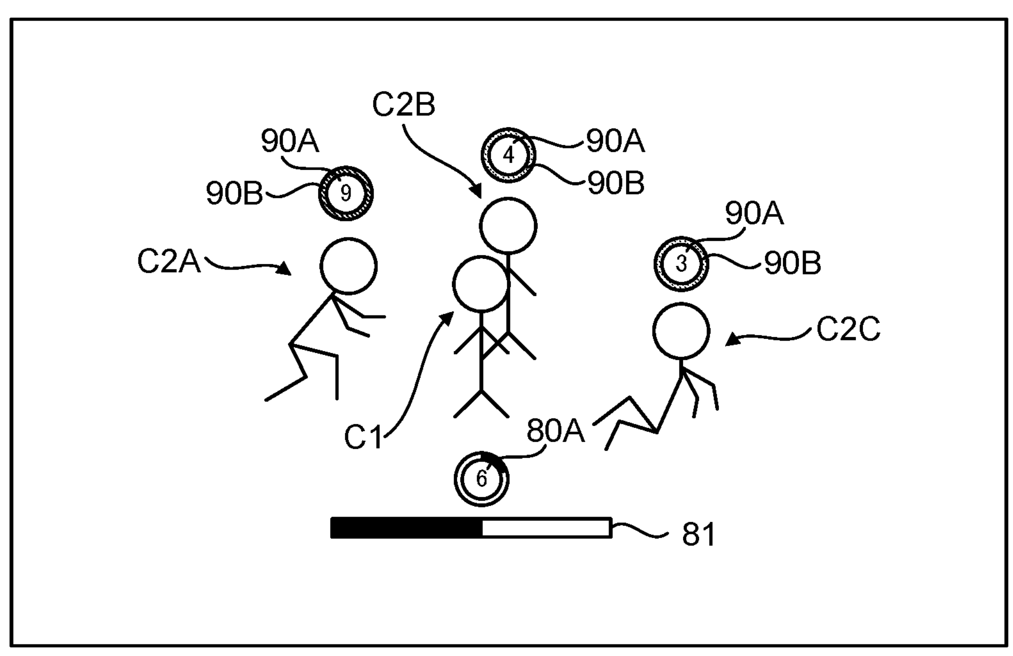

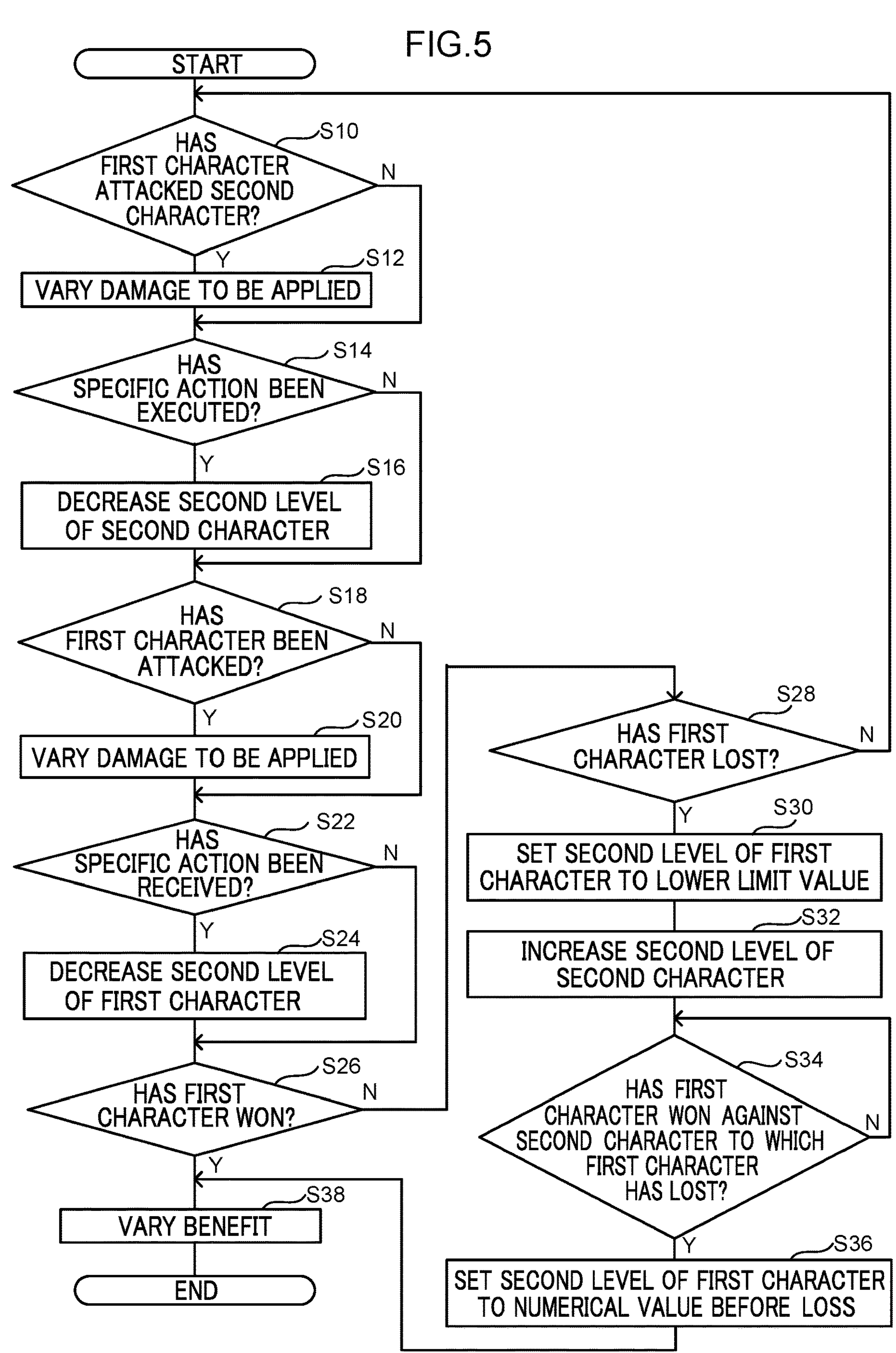
FIG.5
START
HAS FIRST CHARACTER ATTACKED SECOND CHARACTER?
S10
N
Y
VARY DAMAGE TO BE APPLIED
S12
HAS SPECIFIC ACTION BEEN EXECUTED?
S14
N
Y
DECREASE SECOND LEVEL OF SECOND CHARACTER
S16
HAS FIRST CHARACTER BEEN ATTACKED?
S18
N
Y
VARY DAMAGE TO BE APPLIED
S20
HAS SPECIFIC ACTION BEEN RECEIVED?
S22
N
Y
DECREASE SECOND LEVEL OF FIRST CHARACTER
S24
HAS FIRST CHARACTER WON?
S26
N
Y
VARY BENEFIT
S38
END
HAS FIRST CHARACTER LOST?
S28
N
Y
SET SECOND LEVEL OF FIRST CHARACTER TO LOWER LIMIT VALUE
S30
INCREASE SECOND LEVEL OF SECOND CHARACTER
S32
HAS FIRST CHARACTER WON AGAINST SECOND CHARACTER TO WHICH FIRST CHARACTER HAS LOST?
S34
N
Y
SET SECOND LEVEL OF FIRST CHARACTER TO NUMERICAL VALUE BEFORE LOSS
S36

24

PLEASE, INPUT UPPER LIMIT VALUE OF SECOND LEVEL

20

DETERMINE

INFORMATION PROCESSING PROGRAM, INFORMATION PROCESSING METHOD, AND INFORMATION PROCESSING APPARATUS

CROSS-REFERENCE TO RELATED APPLICATION

This application is based on and claims priority under 35 USC 119 from Japanese Patent Application No. 2023-150584, filed on Sep. 15, 2023, the disclosure of which is incorporated by reference herein.

BACKGROUND

Technical Field

The present disclosure relates to an information processing program, an information processing method, and an information processing apparatus.

Related Art

Conventionally, there has been known a game in which a player character controlled by a player acquires an experience value by winning against an enemy character, and the player character is leveled up according to the acquired experience value. The player character is raised by the level-up in a long time.

For example, Japanese Patent Application Laid-Open (JP-A) No. 2007-195676 discloses a technology in which an experience value, which has been acquired from a nearest save point to the time when a video game is over, is reflected at the time of "continue" in accordance with a desire of a player.

In the game in which the player character is leveled up according to the acquired experience value, it is necessary to increase a level of the player character or to be furnished with more powerful equipment in order to go beyond a difficult spot in the game. In the game in which the player character is raised in a long term as described above, many experience values, a lot of in-game currency, many materials for enhancing equipment, and the like are required in order to raise the player character, and thus, considerable preparation is required for enhancement of the player character.

SUMMARY

An object of the disclosure is to provide an information processing program, an information processing method, and an information processing apparatus which enable adjustment of power of a character for each predetermined range as compared with a case in which the character is enhanced only by long-term raising of the character.

An information processing program according to a first aspect causes a computer to execute setting, for a character, a first level that is maintained even when a predetermined range is exceeded and a second level that is not maintained when the predetermined range is exceeded in a game in which a level for determining power is set for the character.

An information processing program according to a second aspect is the information processing program according to the first aspect, in which the first level determines a numerical value indicating ability of a character, the second level determines a variation amount of the numerical value or determines an element other than the numerical value, and the power of the character is adjusted based on the first level and the second level.

An information processing program according to a third aspect is the information processing program according to the first or second aspect causing the computer to further execute performing predetermined processing according to a relative value between the second level of a first character and the second level of a second character different from the first character.

An information processing program according to a fourth aspect is the information processing program according to the third aspect causing the computer to further execute varying at least one of damage to be applied to the second character when the first character attacks the second character and damage to be applied to the first character when the first character is attacked by the second character according to the relative value.

An information processing program according to a fifth aspect is the information processing program according to the third or fourth aspect causing the computer to further execute displaying the relative value in a distinguishable manner.

An information processing program according to a sixth aspect is the information processing program according to the fifth aspect causing the computer to further execute, in a case in which a path along which the first character travels branches into a plurality of paths having different difficulty levels, arranging the second character according to the difficulty level in a predetermined range from a branch point of the plurality of paths in at least one of the plurality of paths.

An information processing program according to a seventh aspect is the information processing program according to any one of the third to sixth aspects causing the computer to further execute varying a benefit that can be obtained by the first character from the second character according to the relative value.

An information processing program according to an eighth aspect is the information processing program according to any one of the third to seventh aspects causing the computer to further execute disabling an action of a character located at a periphery of the second character in a case in which the first character executes a specific action with respect to the second character, and varying an action-disabled time or a reaction of the character located at the periphery according to a relative value between the second level of the character located at the periphery and the second level of the first character.

An information processing program according to a ninth aspect is the information processing program according to any one of the first to eighth aspects causing the computer to further execute disabling an action of a character located at a periphery of the second character in a case in which a first character executes a specific action with respect to a second character, different from the first character, and varying an action-disabled time or a reaction of the character located at the periphery according to a relative value between the second level of the second character and the second level of the character located at the periphery.

An information processing program according to a tenth aspect is the information processing program according to any one of the third to eighth aspects causing the computer to further execute decreasing the second level of the second character in a case in which the first character executes a specific action with respect to the second character.

An information processing program according to an eleventh aspect is the information processing program according to any one of the third to eighth aspects causing the computer to further execute decreasing the second level of the first character in a case in which the first character receives a specific action.

An information processing program according to a twelfth aspect is the information processing program according to any one of the third to eighth aspects causing the computer to further execute: decreasing the second level of the first character from a numerical value before a loss in a case in which the first character loses to the second character; and setting the second level of the first character to the numerical value before the loss in a case in which the first character wins against the second character to which the first character has lost.

An information processing program according to a thirteenth aspect is the information processing program according to the twelfth aspect causing the computer to further execute increasing the second level of the second character in a case in which the first character loses to the second character.

An information processing program according to a fourteenth aspect is the information processing program according to any one of the third to eighth aspects causing the computer to further execute releasing a function executable by the first character or the second character according to the second level of the first character or the second character.

An information processing program according to a fifteenth aspect is the information processing program according to the seventh aspect causing the computer to further execute setting an upper limit value of the second level designated by a player.

An information processing method according to a sixteenth aspect includes setting, by a computer, a first level that is maintained even when a predetermined range is exceeded and a second level that is not maintained when the predetermined range is exceeded for a character in a game in which a level for determining power is set for the character.

An information processing apparatus according to a seventeenth aspect includes a processor, the processor being configured to: set, for a character, a first level that is maintained even when a predetermined range is exceeded and a second level that is not maintained when the predetermined range is exceeded in a game in which a level for determining power is set for the character.

According to the disclosure, the power of the character can be adjusted for each predetermined range as compared with the case in which the character is enhanced only by long-term raising of the character.

BRIEF DESCRIPTION OF THE DRAWINGS

Exemplary embodiments of the present disclosure will be described in detail based on the following figures, wherein:

FIG. 4 is a diagram for describing a reaction of a second character;

FIG. 5 is a flowchart illustrating an example of a battle process;

DETAILED DESCRIPTION

Hereinafter, exemplary embodiments of the technology of the disclosure will be described in detail with reference to the drawings.

First, a hardware configuration of an information processing apparatus 10 according to the present embodiment will be described with reference to FIG. 1. Examples of the information processing apparatus 10 include, for example, a home game machine, a portable game machine, a business game machine, a smartphone, a tablet terminal, a personal computer, and the like. In the embodiment, an example in which the home game machine is applied as the information processing apparatus 10 will be described. The information processing apparatus 10 is an example of a computer.

Figure 1:
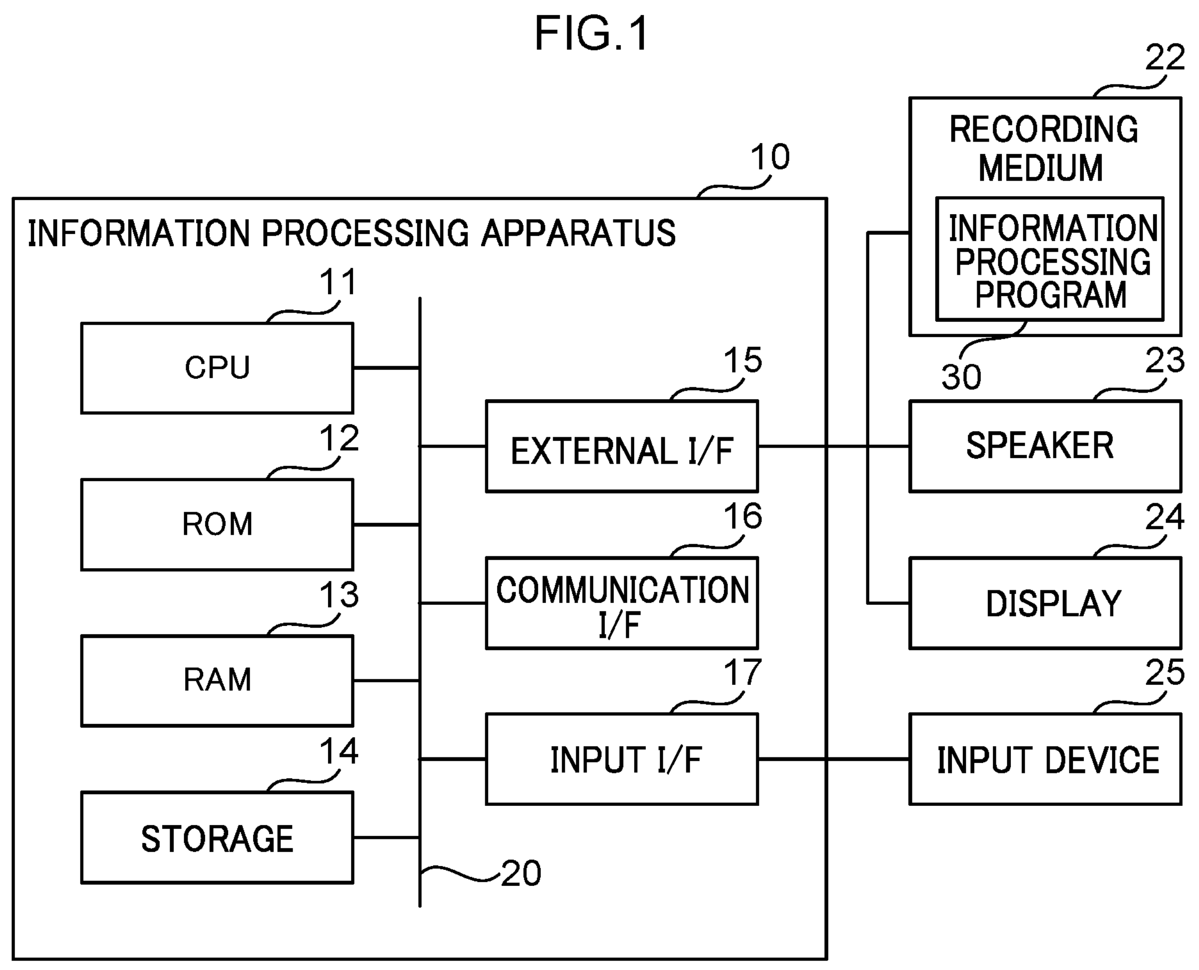
FIG. 1 is a block diagram illustrating an example of a hardware configuration of an information processing apparatus.

As illustrated in FIG. 1, the information processing apparatus 10 includes a central processing unit (CPU) 11, a read only memory (ROM) 12, a random access memory (RAM) 13, a storage 14, an external interface (I/F) 15, a communication I/F 16, and an input I/F 17. The CPU 11, the ROM 12, the RAM 13, the storage 14, the external I/F 15, the communication I/F 16, and the input I/F 17 are connected to be capable of communicating with each other via a bus 20.

The CPU 11 is a central processing unit, and executes various programs and controls each unit. The CPU 11 is an example of a processor. The ROM 12 stores various programs and various types of data. The RAM 13 temporarily stores programs or data as a work area. The storage 14 includes a storage device such as a hard disk drive (HDD), a solid state drive (SSD), or a flash memory, and stores various programs and various types of data.

The external I/F 15 is an interface configured to connect various external devices to the information processing apparatus 10. In the embodiment, a recording medium 22, a speaker 23, and a display 24 are connected to the external I/F 15.

As the recording medium 22, an optical disk, a universal serial bus (USB) memory, an SD memory card, or the like is used. The recording medium 22 stores an information processing program 30 configured to execute a predetermined game in the information processing apparatus 10. The CPU 11 reads the information processing program 30 from the recording medium 22 via the external I/F 15, and executes the information processing program 30 using the RAM 13 as the work area. Note that the information processing program 30 is not limited to an aspect of being stored in the recording medium 22, and may be stored in advance in the storage 14 or may be downloadable to the information processing apparatus 10 via the communication I/F 16.

The speaker 23 outputs various sounds. The speaker 23 may be integrated with the information processing apparatus 10 or may be integrated with the display 24. The display 24 is, for example, a liquid crystal display or an organic electro luminescence (EL) display, and displays various types of information. The display 24 may be integrated with a touch panel. In addition, the display 24 may be integrated with the information processing apparatus 10.

The communication I/F 16 is an interface configured to connect the information processing apparatus 10 to a network. For the communication I/F 16, for example, a wired communication standard such as Ethernet (registered trademark) or a fiber distributed data interface (FDDI), or a wireless communication standard such as 4G, 5G, or Wi-Fi (registered trademark) is used.

The input I/F 17 is an interface configured to connect an input device 25 to the information processing apparatus 10. The input device 25 is a controller having an operation button, a direction key, and the like, a mouse, a keyboard, and the like, and is used to perform various inputs. A user operates the game using the input device 25. Operation information indicating a content of an input operation performed by the user using the input device 25 is stored in the RAM 13. The input device 25 may be integrated with the information processing apparatus 10. In addition, the input device 25 may be detachably attached to the information processing apparatus 10. In addition, the number of the input devices 25 may be one or more. In addition, the input device 25 may be a touch panel integrated with the display 24.

The information processing apparatus 10 according to the embodiment provides the game in which a first character controlled in a virtual space on the game by a player, who is a user of the information processing apparatus 10 do battle with a second character different from the first character. In the game, the second character is arranged on a path along which the first character travels. Although a case in which the second character is a non-player character (NPC) will be described as an example in the embodiment, the disclosed technology is not limited to such an aspect. The second character may be a character controlled by a player different from the player who controls the first character, or may be a combination of the character and the NPC. The game is a set of activities and rules for performing play and competition. The game is played, for example, by players using strategies and skills to achieve particular goals. The game is played to achieve various goals, for example, a goal in competition such as a win or a loss, a goal in a battle such as beating an enemy, an educational goal such as learning, and a narrative goal such as completing the progress of a scenario. The game may be a format of competing against each other or a format of not competing against each other.

In addition, the information processing apparatus 10 provides the game in which a level that determines power is set for a character. For the first character, a first level, which is maintained even in a case of going beyond a predetermined range, and a second level, which is not maintained in a case of going beyond the predetermined range, are set. In the embodiment, a case in which a range defined by a stage is applied as the predetermined range will be described as an example. The power of the character may be further determined on the basis of an element other than the level. The power of the character may be changed on the basis of, for example, equipment items, state anomalies, and other parameters.

The game provided by the information processing apparatus 10 includes a plurality of stages, and a player clears the game by performing selection of a stage and clearing of the selected stage for all the stages. That is, a stage refers to a range that defines a plurality of units prepared in the game to be cleared by a player, and is also referred to as a mission, a quest, or the like depending on the game. Note that the above-described predetermined range may be a range defined by time, such as the first level being a level that is maintained for 9999 hours and the second level being a level that is maintained for 1 hour. In addition, the predetermined range may be a geographical range including a certain spot, a range as a distance from a certain spot to another spot, a range between a certain character or object and another character or object, or the like.

The first level is a level that is maintained even in a case in which the first character shifts from a stage, and determines a numerical value indicating the ability of the first character. The first level is set to an initial value at the start of the game, and increases the numerical value indicating the ability of the first character as the level increases. As a result, the first level enhances the first character. Examples of the numerical value indicating the ability of the first character include numerical values indicating the basic ability of the first character such as strength, hit points, and agility. The first level is set to raise the first character in a long term from the start of the game to clearing of the game.

The second level is a level that is not maintained in a case in which the first character shifts from a stage, and is set for each stage. The second level determines a variation amount of the numerical value indicating the ability of the first character. The variation amount refers to, for example, a weighting factor used when damage caused when the first character attacks the second character, damage received when the first character is attacked by the second character, and the like on the basis of the numerical value indicating the ability of the first character. In this manner, the CPU 11 of the information processing apparatus 10 according to the embodiment adjusts the power of the first character on the basis of the first level and the second level. The second level is set to an initial value at the start of each stage, and the level increases or decreases according to a condition to be described later. In addition, the second level is also set for the second character. Note that the first level may also be set for the second character. In addition, the second level may increase or decrease the numerical value indicating the ability of the character, or may correct the numerical value indicating the ability of the character determined by the first level. In addition, the second level may determine an element other than the numerical value indicating the ability of the character. Examples of the element in this case include a skill that can be used by the character, and the like.

Figure 2:
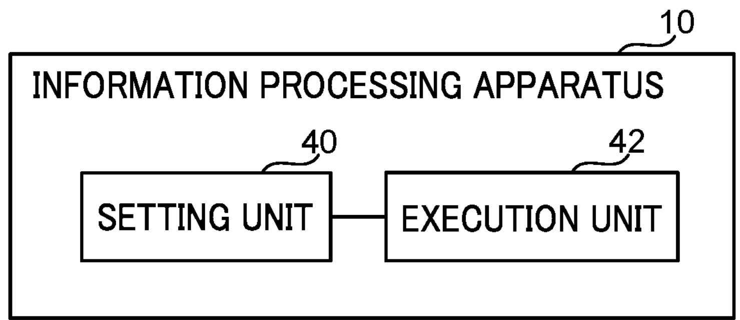
FIG. 2 is a block diagram illustrating an example of a functional configuration of the information processing apparatus.

Next, a functional configuration of the information processing apparatus 10 will be described with reference to FIG. 2. As illustrated in FIG. 2, the information processing apparatus 10 includes a setting unit 40 and an execution unit 42. The CPU 11 executes the information processing program 30 to function as the setting unit 40 and the execution unit 42.

The setting unit 40 sets the first level and the second level for the first character. Specifically, the setting unit 40 sets the first level of the first character to the initial value at the start of the game, and increases the first level each time a condition defined as a level-up condition is satisfied. Examples of the level-up condition include acquisition of a predetermined experience value, use of an item having a level-up effect, and the like.

In addition, the setting unit 40 sets the second level of the first character to the initial value at the start of a stage, and increases or decreases the second level of the first character in a case in which a predetermined condition is satisfied. In addition, the setting unit 40 sets the second level of the second character to the initial value at the start of a stage, and increases or decreases the second level of the second character in a case in which a predetermined condition is satisfied. Note that the setting unit 40 may set the second level of the second character to the initial value at a timing at which the second character is rearranged, such as a timing at which the first character reaches a check point and a timing at which a certain period of time has elapsed.

Hereinafter, details of conditions for increasing or decreasing the second level by the setting unit 40 will be described. In a case in which the first character executes a specific action with respect to the second character, the setting unit 40 decreases the second level of the second character. Examples of the specific action executed by the first character in this case include use of a special attack different from a normal attack such as a special move, use of a specific magic, use of a specific item, and the like.

In addition, in a case in which the first character receives a specific action, the setting unit 40 decreases the second level of the first character. Examples of the specific action in this case include use of a special attack different from a normal attack by the second character, use of a specific magic, use of a specific item, and the like. In addition, examples of the specific action in this case also include damage of the first character caused by a trap installed on a stage, and the like in addition to those executed by the second character.

In addition, the setting unit 40 sets the second level of the first character to a lower limit value in a case in which the first character loses to the second character. Note that the disclosed technology is not limited to such an aspect in which the setting unit 40 decreases the second level of the first character to the lower limit value in the case in which the first character loses to the second character. For example, the setting unit 40 may decrease the second level of the first character by a set numerical value from a numerical value before the loss in the case in which the first character loses to the second character. The numerical value in this case may be a preset fixed value, or may be a value set according to a relative value between the second level of the first character and the second level of the second character. In addition, the setting unit 40 may switch a method for decreasing the second level of the first character or a decrease width according to a game difficulty level, such as an easy mode, a normal mode, or a hard mode, in the case in which the first character loses to the second character. In addition, the setting unit 40 increases the second level of the second character in the case in which the first character loses to the second character. The term "loss" referred to herein means that the first character is attacked by the second character in a battle with the second character so that hit points become zero and the battle ends, for example. In addition, the loss may include the end of the battle by satisfying conditions other than winning the battle, such as the end of the battle by exceeding a time limit in one battle.

In addition, in a case in which the first character wins against the second character to which the first character has lost, the setting unit 40 sets the second level of the first character to a numerical value before the loss. In this case, the setting unit 40 may set a time limit until the first character fights again with the second character to which the first character has lost.

The execution unit 42 performs predetermined processing according to the relative value between the second level of the first character and the second level of the second character (hereinafter, simply referred to as the "relative value"). In the embodiment, a case in which a difference obtained by subtracting the second level of the second character from the second level of the first character is applied as the relative value will be described as an example. Hereinafter, details of the above-described predetermined processing executed according to the relative value will be described.

The execution unit 42 varies damage to be applied to the second character when the first character attacks the second character according to the relative value. When the first character attacks the second character, the execution unit 42 calculates the damage according to the numerical values indicating the ability of each of the first character and the second character and a second rank. At this time, as the relative value increases, the execution unit 42 increases the damage to be applied to the second character when the first character attacks the second character.

In addition, the execution unit 42 varies damage to be applied to the first character when the first character is attacked by the second character according to the relative value. When the first character is attacked by the second character, the execution unit 42 calculates the damage according to the numerical values indicating the ability of each of the first character and the second character and the second rank. At this time, as the relative value increases, the execution unit 42 decreases the damage to be applied to the first character when the first character is attacked by the second character.

Figure 3:
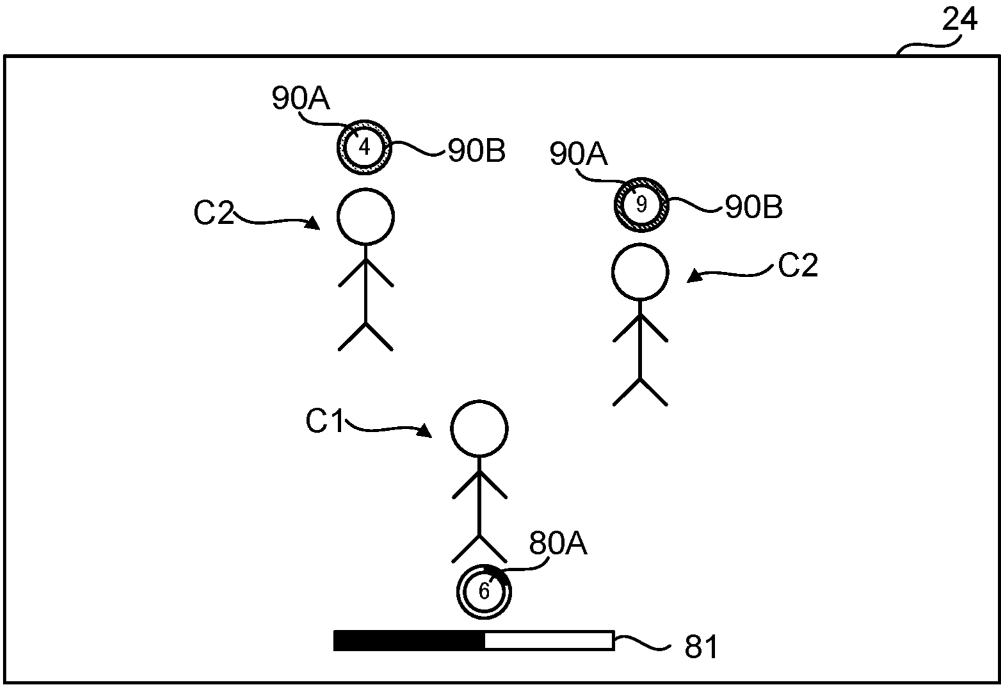
FIG. 3 is a diagram illustrating an example of a display mode of a second level.

In addition, the execution unit 42 causes the display 24 to display the relative value in a distinguishable manner by changing a display mode according to the relative value. An example of the display mode of the second level will be described with reference to FIG. 3. In FIG. 3, C1 indicates the first character, and C2 indicates the second characters. FIG. 3 illustrates an example in which there are one first character and two second characters. The execution unit 42 displays a numerical value representing the second level of the first character in a display area 80A below the first character. In addition, the execution unit 42 displays a gauge indicating a proportion of remaining hit points of the first character in a display area 81 below the display area 80A.

In addition, the execution unit 42 displays a numerical value representing the second level of the second character in a display area 90A above the second character. The display area 90A is provided with an outer frame 90B, and the execution unit 42 displays a relative value in a distinguishable manner by varying a color of the outer frame 90B according to the relative value. For example, the execution unit 42 provides two thresholds TH1 and TH2 (TH1>TH2), sets the threshold TH1 to a value (for example, zero) indicating a difference corresponding to a level equivalent to the second level of the first character, and sets the threshold TH2 to a value (for example, −5) indicating a difference corresponding to a level higher than the second level of the first character by a predetermined level. Then, the execution unit 42 sets a color of the outer frame 90B to red when the relative value is smaller than the threshold TH2, sets the color of the outer frame 90B to yellow when the relative value is the threshold TH2 or larger but smaller than the threshold TH1, and sets the color of the outer frame 90B to green when the relative value is the threshold TH1 or larger. As a result, the player can immediately grasp a difference in power between the first character and the second character.

In addition, the execution unit 42 varies a benefit that can be obtained from the second character when the first character wins against the second character according to the relative value. Specifically, as the relative value increases, the execution unit 42 sets a better benefit as the benefit that can be obtained from the second character when the first character wins against the second character. Examples of the benefit include an experience value that can be obtained by the first character, improvement of rarity of an item dropped by the second character, and improvement of a drop rate of an item of the second character.

In a case in which the first character executes a specific action with respect to the second character, the execution unit 42 disables an action of a character located at the periphery of the second character. In this case, the execution unit 42 further varies an action-disabled time of the character located at the periphery of the second character according to the relative value between the second level of the character located at the periphery of the second character and the second level of the first character. Specifically, the execution unit 42 increases the action-disabled time as the relative value increases. Examples of the specific action in this case include an attack on the second character from outside a field of view of the second character by the first character, and an attack that blows away the character located at the periphery of the second character, such as a finishing blow when the first character beats the second character.

As illustrated in FIG. 4, in a case in which the first character executes the specific action with respect to the second character, the execution unit 42 may vary a reaction of the character located at the periphery of the second character according to the relative value. In FIG. 4, C1 indicates the first character, and C2A to C2C indicate the second characters. In addition, FIG. 4 illustrates an example of a case in which the first character executes the specific action with respect to the second character C2B. That is, the second characters C2A and C2C correspond to the character located at the periphery of the second character C2B. Note that the term "periphery" referred to herein may be, for example, a range within a predetermined distance in the game centered on the second character on which the first character has executed the specific action, or a range represented by the entire region displayed on a screen.

In this case, as illustrated in FIG. 4, the execution unit 42 causes the second character C2A whose relative value is smaller than the threshold TH2 to take a reaction of staggering. The execution unit 42 causes the second character C2C whose relative value is the threshold TH1 or larger to take a reaction of taking a pratfall. In this manner, the execution unit 42 may be able to determine a length of the action-disabled time depending on a reaction.

This creates strategic characteristics such as in which sequence the player kills the plurality of second characters.

Note that, in the case in which the first character executes the specific action with respect to the second character, the execution unit 42 disables an action of the character located at the periphery of the second character and performs the following processing. In this case, the execution unit 42 may vary the action-disabled time or a reaction of the character located at the periphery of the second character according to the relative value between the second level of the second character and the second level of the character located at the periphery of the second character.

Next, an operational effect of the information processing apparatus 10 will be described with reference to FIG. 5. The CPU 11 executes the information processing program 30 to execute a battle process illustrated in FIG. 5. The battle process is executed, for example, when the first character starts a battle against the second character.

In step S10 of FIG. 5, the execution unit 42 determines whether or not the first character has attacked the second character. In a case in which a positive determination is made in the determination, the processing proceeds to step S12. In step S12, the execution unit 42 varies damage to be applied to the second character when the first character attacks the second character according to the relative value as described above. In a case in which a negative determination is made in the determination in step S10, the processing in step S12 is not executed, and the processing proceeds to step S14.

In step S14, the setting unit 40 determines whether or not the first character has executed the specific action with respect to the second character. In a case in which a positive determination is made in the determination, the processing proceeds to step S16. In step S16, the setting unit 40 decreases the second level of the second character. In a case in which a negative determination is made in the determination in step S14, the processing in step S16 is not executed, and the processing proceeds to step S18.

In step S18, the execution unit 42 determines whether or not the first character has been attacked by the second character. In a case in which a positive determination is made in the determination, the processing proceeds to step S20. In step S20, the execution unit 42 varies damage to be applied to the first character when the first character is attacked by the second character according to the relative value as described above. In a case in which a negative determination is made in the determination in step S18, the processing in step S20 is not executed, and the processing proceeds to step S22.

In step S22, the setting unit 40 determines whether or not the first character has received the specific action. In a case in which a positive determination is made in the determination, the processing proceeds to step S24. In step S24, the setting unit 40 decreases the second level of the first character. In a case in which a negative determination is made in the determination in step S22, the processing in step S24 is not executed, and the processing proceeds to step S26.

In step S26, the execution unit 42 determines whether or not the first character has won against the second character. In a case in which a negative determination is made in the determination, the processing proceeds to step S28. In step S28, the execution unit 42 determines whether or not the first character has lost to the second character. In a case in which a negative determination is made in the determination, the processing returns to step S10. In a case in which a positive determination is made, the processing proceeds to step S30. In step S30, the setting unit 40 sets the second level of the first character to the lower limit value. In step S32, the setting unit 40 increases the second level of the second character.

In step S34, the execution unit 42 determines whether or not the first character has won against the second character to which the first character has lost. In a case in which a negative determination is made in the determination, step S34 is executed again. In a case in which a positive determination is made, the processing proceeds to step S36. In step S36, the setting unit 40 sets the second level of the first character to a numerical value before the loss.

If the processing in step S36 ends, the processing proceeds to step S38. In a case in which a positive determination is made in the determination in step S26, the processing proceeds to step S38. In step S38, the execution unit 42 varies a benefit given when the first character wins against the second character according to the relative value as described above. If the processing in step S38 ends, the battle process ends. Note that step S38 may be executed before step S36 in a case in which a positive determination is made in the determination in step S34.

As described above, the power of the character can be adjusted for each predetermined range as compared with a case in which the character is enhanced only by long-term raising of the character according to the embodiment.

Although a case in which the difference obtained by subtracting the second level of the second character from the second level of the first character is applied as the relative value has been described in the embodiment, the disclosed technology is not limited to this aspect. For example, a difference obtained by subtracting the second level of the first character from the second level of the second character may be applied as the relative value. In addition, as the relative value, a ratio obtained by dividing the second level of the first character by the second level of the second character may be applied, or a ratio obtained by dividing the second level of the second character by the second level of the first character may be applied.

Figures 6, 7:
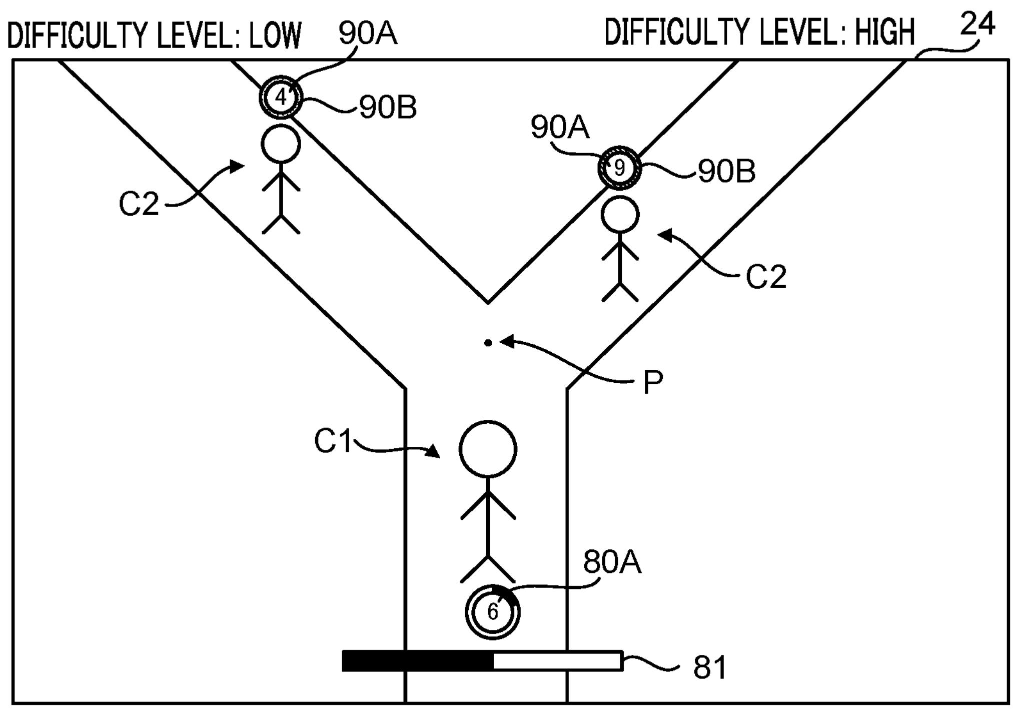
FIG. 6 is a diagram for describing an arrangement state of the second character in a plurality of paths having different difficulty levels.
FIG. 7 is a view illustrating an example of a screen for setting an upper limit value of the second level.

In the embodiment, in a case in which a path along which the first character travels branches into a plurality of paths having different difficulty levels as illustrated in FIG. 6, the CPU 11 may arrange the second character according to the difficulty level in a predetermined range from a branch point of the plurality of paths in at least one of the plurality of paths. In FIG. 6, C1 indicates the first character, C2 indicates the second character, and P indicates the branch point. Specifically, for example, the CPU 11 arranges the second character having a higher second level in a path having a higher difficulty level among the plurality of paths. The predetermined range may be a region on a stage corresponding to a display range of the display 24. This enables the player to select any path among the plurality of paths along which the player travels according to a play style. Although FIG. 6 illustrates an example in which the path along which the first character travels branches into two paths, the path along which the first character travels may branch into three or more paths.

In the embodiment, the CPU 11 may release a function that is executable by the first character according to the second level of the first character. Examples of the executable function in this case include enabling the first character to use a specific action, enhancing a specific action that can be used by the first character, reducing resource consumption when the first character executes a specific action, and the like. In addition, examples of the executable function in this case also include making a weak point of the second character visible, an escape of the second character even if the first character does not take any action, and the like. Similarly, the CPU 11 may release a function that is executable by the second character according to the second level of the second character.

In the embodiment, the setting unit 40 may set an upper limit value of the second level that is designated by the player, the value being smaller than an upper limit value of the second level on a system. For example, as illustrated in FIG. 7, the player inputs the upper limit value of the second level on a screen for setting the upper limit value of the second level. The setting unit 40 sets the upper limit value of the second level designated in this manner. As a result, for example, the second level of the first character becomes a relatively high level, so that it is possible to suppress the benefit that can be obtained when the first character wins against the second character from becoming unsatisfactory.

In the embodiment, the setting unit 40 may set a level of the player to the first level of the first character.

In addition, various processes executed by the CPU 11 reading software (program) in the embodiment may be executed by various processors other than the CPU. Examples of the processors in this case include a programmable logic device (PLD) whose circuit configuration can be changed after manufacturing, such as a field-programmable gate array (FPGA), a dedicated electric circuit that is a processor having a circuit configuration exclusively designed for executing specific processing, such as an application specific integrated circuit (ASIC), and the like. In addition, various processes may be executed by one of the various processors, or may be executed by any combination of two or more processors of the same type or different types (for example, a plurality of FPGAs, a combination of a CPU and an FPGA, and the like). More specifically, a hardware structure of the various processors is an electric circuit in which circuit elements such as semiconductor elements are combined.

What is claimed is:

1. A non-transitory computer-readable recording medium in which an information processing program is recorded, the information processing program causing a computer to execute setting, for a character, a first level that is maintained even when a predetermined range is exceeded, and a second level that is not maintained when the predetermined range is exceeded in a game in which a level for determining power is set for the character;

performing predetermined processing according to a relative value between the second level of a first character and the second level of a second character different from the first character; and varying a display mode according to the relative value, and displaying the relative value on a game screen in a user-distinguishable manner by associating the relative value with a corresponding character.

2. The non-transitory computer-readable recording medium in which the information processing program is recorded according to claim 1, wherein the first level determines a numerical value indicating ability of a character, the second level determines a variation amount of the numerical value or determines an element other than the numerical value, and the power of the character is adjusted based on the first level and the second level.

3. The non-transitory computer-readable recording medium in which the information processing program is recorded according to claim 1, the information processing program causing the computer to further execute varying at least one of damage to be applied to the second character when the first character attacks the second character and damage to be applied to the first character when the first character is attacked by the second character according to the relative value.

4. The non-transitory computer-readable recording medium in which the information processing program is recorded according to claim 1, the information processing program causing the computer to further execute in a case in which a path along which the first character travels branches into a plurality of paths having different difficulty levels, arranging the second character according to the difficulty level in a predetermined range from a branch point of the plurality of paths in at least one of the plurality of paths.

5. The non-transitory computer-readable recording medium in which the information processing program is recorded according to claim 1, the information processing program causing the computer to further execute varying a benefit that can be obtained by the first character from the second character according to the relative value.

6. The non-transitory computer-readable recording medium in which the information processing program is recorded according to claim 1, the information processing program causing the computer to further execute disabling an action of a character located at a periphery of the second character in a case in which the first character executes a specific action with respect to the second character, and varying an action-disabled time or a reaction of the character located at the periphery according to a relative value between the second level of the character located at the periphery and the second level of the first character.

7. The non-transitory computer-readable recording medium in which the information processing program is recorded according to claim 1, the information processing program causing the computer to further execute disabling an action of a character located at a periphery of the second character in a case in which a first character executes a specific action with respect to a second character, different from the first character, and varying an action-disabled time or a reaction of the character located at the periphery according to a relative value between the second level of the second character and the second level of the character located at the periphery.

8. The non-transitory computer-readable recording medium in which the information processing program is recorded according to claim 1, the information processing program causing the computer to further execute decreasing the second level of the second character in a case in which the first character executes a specific action with respect to the second character.

9. The non-transitory computer-readable recording medium in which the information processing program is recorded according to claim 1, the information processing program causing the computer to further execute decreasing the second level of the first character in a case in which the first character receives a specific action.

10. The non-transitory computer-readable recording medium in which the information processing program is recorded according to claim 1, the information processing program causing the computer to further execute:

decreasing the second level of the first character from a numerical value before a loss in a case in which the first character loses to the second character; and setting the second level of the first character to the numerical value before the loss in a case in which the first character wins against the second character to which the first character has lost.

11. The non-transitory computer-readable recording medium in which the information processing program is recorded according to claim 10, the information processing program causing the computer to further execute increasing the second level of the second character in a case in which the first character loses to the second character.

12. The non-transitory computer-readable recording medium in which the information processing program is recorded according to claim 1, the information processing program causing the computer to further execute releasing a function executable by the first character or the second character according to the second level of the first character or the second character.

13. The non-transitory computer-readable recording medium in which the information processing program is recorded according to claim 5, the information processing program causing the computer to further execute setting an upper limit value of the second level designated by a player.

14. An information processing method comprising setting, by a computer, a first level that is maintained even when a predetermined range is exceeded and a second level that is not maintained when the predetermined range is exceeded for a character in a game in which a level for determining power is set for the character;

performing predetermined processing according to a relative value between the second level of a first character and the second level of a second character different from the first character; and varying a display mode according to the relative value, and displaying the relative value on a game screen in a user-distinguishable manner by associating the relative value with a corresponding character.

15. An information processing apparatus comprising a processor, the processor being configured to set, for a character, a first level that is maintained even when a predetermined range is exceeded and a second level that is not maintained when the predetermined range is exceeded in a game in which a level for determining power is set for the character;

perform predetermined processing according to a relative value between the second level of a first character and the second level of a second character different from the first character; and vary a display mode according to the relative value, and display the relative value on a game screen in a user-distinguishable manner by associating the relative value with a corresponding character.

* * * * *